(12) United States Patent
Foster et al.

(10) Patent No.: US 8,942,897 B2
(45) Date of Patent: Jan. 27, 2015

(54) SYSTEM AND METHOD FOR DETERMINING A LOCATION OF AN UNLOADED UNIT OF AGRICULTURAL PRODUCT AND LOCATING A DESIRED UNIT OF AGRICULTURAL PRODUCT

(71) Applicant: CNH America LLC, New Holland, PA (US)

(72) Inventors: Christopher A. Foster, Denver, PA (US); Justin R. Ringwald, Ellinwood, KS (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/845,880

(22) Filed: Mar. 18, 2013

(65) Prior Publication Data

US 2014/0278083 A1 Sep. 18, 2014

(51) Int. Cl.
| | | |
|---|---|---|
| G06Q 50/02 | (2012.01) | |
| G06F 19/00 | (2011.01) | |
| G01S 19/14 | (2010.01) | |
| A01B 79/00 | (2006.01) | |
| A01D 46/08 | (2006.01) | |

(52) U.S. Cl.
CPC ............... G06Q 50/02 (2013.01); G06F 19/00 (2013.01); G01S 19/14 (2013.01); A01D 46/08 (2013.01); A01B 79/005 (2013.01)
USPC ............ 701/50; 342/147; 340/5.92; 700/215; 700/225; 700/226; 700/229; 701/482; 701/484

(58) Field of Classification Search
None
See application file for complete search history.

(56) References Cited

U.S. PATENT DOCUMENTS

| | | | |
|---|---|---|---|
| 5,845,229 A | 12/1998 | Rawlins | |
| 6,563,417 B1 | 5/2003 | Shaw | |
| 6,614,392 B2 | 9/2003 | Howard | |
| 6,687,616 B1 * | 2/2004 | Peterson et al. | 702/5 |
| 6,691,135 B2 | 2/2004 | Pickett et al. | |
| 7,034,683 B2 | 4/2006 | Ghazarian | |
| 7,082,740 B2 | 8/2006 | van der Lely | |
| 7,085,777 B2 | 8/2006 | Beck et al. | |
| 7,250,858 B2 | 7/2007 | Schmidtberg et al. | |
| 7,313,549 B2 | 12/2007 | Hudson | |
| 7,336,181 B2 | 2/2008 | Nowak et al. | |
| 7,394,372 B2 | 7/2008 | Gloekler et al. | |
| 7,397,358 B2 | 7/2008 | Boothroyd | |
| 7,415,924 B2 | 8/2008 | Roberts | |
| 7,434,375 B2 | 10/2008 | Pickett et al. | |
| 7,756,719 B2 * | 7/2010 | Beck et al. | 705/28 |
| 7,932,827 B2 * | 4/2011 | Chand et al. | 340/572.1 |
| 2003/0228894 A1 * | 12/2003 | Covington et al. | 460/119 |

(Continued)

OTHER PUBLICATIONS

PCT/US2014/010980, PCT International Search Report and Written Opinion dated Apr. 24, 2014.

*Primary Examiner* — John R Olszewski
*Assistant Examiner* — Jeffrey Boomer
(74) *Attorney, Agent, or Firm* — Rebecca L. Henkel (57) ABSTRACT

A system and method for determining a location of an unloaded unit of agricultural product and locating a desired unit of agricultural product or identifying a candidate unit of agricultural product as a function of sensing system information indicating contact of the unit with the ground or other surface onto which the unit is unloaded, global positioning system or other location system information identifying the contact or related location, and heading information, which information can then be used to discern the unit from others at the location for desired loading.

20 Claims, 11 Drawing Sheets

(56) References Cited

U.S. PATENT DOCUMENTS

| | | |
|---|---|---|
| 2005/0107934 A1 | 5/2005 | Gudat et al. |
| 2006/0086263 A1* | 4/2006 | Degen .............................. 100/88 |
| 2006/0255948 A1* | 11/2006 | Runyon et al. ............. 340/572.7 |
| 2006/0255951 A1* | 11/2006 | Roeder et al. .............. 340/572.7 |
| 2007/0181469 A1 | 8/2007 | Stover |
| 2007/0282482 A1* | 12/2007 | Beucher et al. ............... 700/225 |
| 2008/0052876 A1 | 3/2008 | Stover |
| 2008/0117023 A1 | 5/2008 | Wilcox et al. |
| 2008/0143482 A1 | 6/2008 | Shoarinejad et al. |
| 2008/0252459 A1 | 10/2008 | Butler et al. |
| 2008/0278328 A1* | 11/2008 | Chand et al. ............... 340/572.1 |
| 2010/0299029 A1* | 11/2010 | Fackler et al. .................. 701/50 |
| 2012/0319837 A1 | 12/2012 | Foster |
| 2013/0006481 A1 | 1/2013 | Foster |

\* cited by examiner

RECORD
COTTON MODULE IDENTIFIER

PLANTING, GROWING & HARVESTING INFORMATION

SEED TYPE   YIELD DATA AT TIME OF HARVEST   MOISTURE CONTENT
TIMING AND QUANTITY OF ONE OR MORE CHEMICALS OR FERTILIZERS
AREA OF THE FIELD FROM WHICH COTTON MODULE WAS HARVESTED

TRACKING AND POSSESSION HISTORY

| HARVESTING VEHICLE ID | OPERATOR ID | UNLOADING LOCATION | VEHICLE HEADING | UNLOADING TIME & DATE | COMMENTS |
|---|---|---|---|---|---|
| TRANSPORT VEHICLE ID | OPERATOR ID | LOADING LOCATION | VEHICLE HEADING | LOADING TIME & DATE | COMMENTS |
| TRANSPORT VEHICLE ID | OPERATOR ID | UNLOADING LOCATION | VEHICLE HEADING | UNLOADING TIME & DATE | COMMENTS |

. . .

| TRANSPORT VEHICLE ID | OPERATOR ID | LOADING LOCATION | VEHICLE HEADING | LOADING TIME & DATE | COMMENTS |
|---|---|---|---|---|---|
| TRANSPORT VEHICLE ID | OPERATOR ID | UNLOADING LOCATION | VEHICLE HEADING | UNLOADING TIME & DATE | COMMENTS |

PROCESSING AND CLASSIFICATION INFORMATION

PROCESSING FACILITY   YIELD DATA AT THE PROCESSING FACILITY
SEED COTTON WEIGHT    LINT WEIGHT         COTTON GRADE
COTTON COLOR          UNIFORMITY          TRASH CONTENT
COTTON FIBER DIAMETER                     COTTON FIBER STRENGTH

SYSTEM AND METHOD FOR DETERMINING A LOCATION OF AN UNLOADED UNIT OF AGRICULTURAL PRODUCT AND LOCATING A DESIRED UNIT OF AGRICULTURAL PRODUCT

TECHNICAL FIELD

This invention relates generally to tracking or locating units of agricultural product, and more particularly to a system and method for determining a location of an unloaded unit of agricultural product and locating a desired unit of agricultural product as a function of global positioning or other locating system information.

BACKGROUND ART

Agricultural material, such as cotton, forage, silage, haylage, biomass, and the like, are commonly packaged in large unitary bales or modules. Presently, large baling and packaging apparatus carried on or towed by harvesting vehicles, also referred to as balers, module builders or on-board module builders (OBMB), are capable of forming bales and modules as large as 8 feet by 8 feet by 16 feet (approx. 250 by 250 by 500 cm). These bales and modules are unloaded to ground level and are wrapped or covered with tarps designed to cover the top and a portion of the sides of the bales or modules. This unloading can occur in the field, or at the periphery of the field, and the bales or modules are picked up later by transport vehicles and taken for processing, use, or storage. It is not uncommon for bales or modules to be unloaded, loaded, and transported several times, including in large groupings and abutting positions, and wherein markings may not be readily visible or it may otherwise be difficult to visually discern one module or bale from another, e.g., a long row or rows of modules or bales along the periphery of a field or in a storage or collection area.

In precision farming operations, an accurate mapping of the characteristics of the harvested agricultural product is desired for correlation with information stored at various phases of production, such as planting, growing, harvesting, transporting, processing, or classifying. Analysis of this mapping may allow a farmer to improve crop yield and quality. For example, the farmer may identify an area of the field in which the yield was lower than expected, identify the planting and chemical application for that area, and adjust accordingly. At the next harvest, the farmer can analyze the characteristics of the crop for that area of the field and determine if the adjustment was satisfactory.

In many situations, it is desirable to record, correlate, and analyze information associated with transporting the bales or modules of agricultural product. This information may be of value in determining the effectiveness of equipment, efficiency and timeliness of vehicles, operators, and the like. This record may provide information for determining ownership and/or liability for damage that may occur to the bales or modules during transport.

To facilitate the collection of information for analysis, it is important to know the area in the field from which a particular bale or module is harvested. It may also be important to know the location of harvest or identity for tracking ownership of a bale, e.g., tenant or operator verses landowner or gin operator. Often the bales or modules are marked with a hand written load identifier for this purpose. However, physically marking modules and bales is labor intensive and prone to human error. Also, many times modules and bales are covered, either with a reusable or disposable cover or tarp at some point which may cover markings or which may be previously marked so as to confuse, and/or the markings may be obscured or made difficult to read at times, such as by adjacent modules or bales, dirt, darkness, etc.

It would be beneficial to identify bales or modules by global positioning system (GPS) coordinates or another tracking system instead of, or in addition to, the known manners of physical marking. In this regard, numerous system are known that use a tarp or cover having an associated electronically trackable tag, e.g., an RFID tag GPS transponder, or the like. There are also more recently known systems that utilize a tag or transponder embedded in or attached to the bale or module itself, including as it is formed or unloaded. However, observed possible shortcomings of these systems include, in the instance of those tracked by cover or tarp, mis-tagging, e.g., as a result of human error or confusion, lost covers or tarps from wind or vandalism, and in both cases, battery and/or other equipment failure. As another potential problem, when bales or modules are unloaded, one known manner of unloading involves tilting module or bale making or building apparatus, extending a long ramp therefrom, and moving along the ground or other surface as the bale or module travels down the inclined ramp. When the bale or module contacts the ground, it may drag thereover for some distance until it is finally unloaded and stationary. Thus if the bale or module itself does not carry a tag or transponder, it can be difficult to ascertain at what point it became stationary, for purposes of recording its location from the unloading vehicle. Bales and modules are frequently stored in close proximity, e.g., in end to end relation, and without accurate unloading location information for the individual bales or modules, it may not be possible for loading personnel to discern the identity of a particular bale or module. As an example in this regard, if cotton modules are marked on one end, such as the forward end when being unloaded from a harvester, if two or more modules are located on a field in end to end relation, with the front ends in abutment, it may not be possible or easy to discern one from the other using available location information, e.g., RFID tag or GPS information alone. As a result, it would be particularly beneficial to use a history of GPS coordinates to track or identify a bale or module that is moved prior to being marked. If bales or modules are identified in error, the information associated with the mapping of the field will be in error, and any future decisions made will be based on incorrect information.

Accordingly, what is sought is a system and method for determining a location of an unloaded unit of agricultural product and locating a desired unit of agricultural product among candidate units of agricultural product as a function of global positioning or other location system information, which overcomes at least one of the problems, shortcomings or disadvantages as set forth above.

SUMMARY OF THE INVENTION

What is disclosed is a system and method for determining a location of an unloaded unit of agricultural product and locating a desired unit of agricultural product among candidate units of agricultural product as a function of global positioning or other location system information, which overcomes at least one of the problems, shortcomings or disadvantages as set forth above.

According to a preferred embodiment of the present invention, a system and method for determining a location of an unloaded unit of agricultural product and locating a desired unit of agricultural product includes a communication network configured and operable to communicate information between an unloading vehicle and a loading vehicle or between a central or base location and the unloading vehicle and the loading vehicle. The vehicles each include a holding structure for the unit of agricultural product and a structure deployable from the holding structure to a surface therebelow. On or associated with the structure is an apparatus configured and operable to move the unit of agricultural product from the holding structure to the surface therebelow, or another vehicle or location separate from the structure. The unloading vehicle has a sensing system configured and operable to sense when the unit of agricultural product has reached and is stationary on the surface or a location in predetermined relation thereto, and provide an indicator representative thereof. The system also includes a location system configured and operable to receive information identifying a location of a receiver of the loading or unloading vehicle, e.g., global positioning system or other positioning system information, and a heading system configured and operable to determine or approximate a heading of the loading or unloading vehicle, which systems and/or functions may be combined. At least one controller is in communication with the sensing system, the location system, and the heading system, and the at least one controller is configured and operable to automatically determine a location of the unloaded unit of agricultural product as a function of the location of the receiver of the unloading vehicle and the heading thereof, when the sensing system has sensed and indicated that the unit of agricultural product has reached and is stationary on the surface or the location in predetermined relation thereto.

According to a preferred aspect of the invention, the loading vehicle deployable structure includes an apparatus configured and operable to move the desired unit of agricultural product from the surface to its holding structure. In addition, the sensing system is configured and operable to sense when the deployed structure has reached a candidate unit of agricultural product or a location in predetermined relation thereto, and provide an indicator representative thereof. The at least one controller is configured and operable to automatically determine whether the candidate unit of agricultural product is the desired unit of agricultural product as a function of the location of the receiver of the loading vehicle and the heading thereof, when the sensing system has determined or sensed that the structure has reached the candidate unit of agricultural product or the location in predetermined relation thereto.

According to another preferred aspect of the invention, the at least one controller determines a location of the candidate unit of agricultural product as a function of the location of the receiver of the loading vehicle when the sensing system has sensed and indicated that the structure has reached the candidate unit of agricultural product or the location in predetermined relation thereto.

According to a preferred feature of the invention, the desired unit of agricultural product comprises the candidate unit of agricultural product having the location within a predetermined radius, or distance and direction, from the location of the desired unit of agricultural product.

According to another preferred feature of the invention, the heading of the unloading vehicle of the desired unit of agricultural product is compared to the heading of the loading vehicle of the candidate unit of agricultural product.

According to yet another preferred aspect of the invention, when the controller determines that the candidate unit of agricultural product is the desired unit of agricultural product, the loading vehicle apparatus engages and moves the desired unit along the structure from the surface to the holding structure in the loading vehicle.

According to yet another preferred feature of the invention, the location of the unit of agricultural product comprises a location of a predetermined reference point of the unit, and the predetermined reference point is a function of the heading of the unloading vehicle.

According to yet another preferred aspect of the invention, a record, stored in a database, is associated with the unit of agricultural product, and the record includes at least information representative of unloading or loading vehicle identification, unloading or loading time, unloading or loading location, and the heading of the unloading or loading vehicle, respectively, for each time the unit of agricultural product is unloaded or loaded.

According to yet another preferred aspect of the invention, when the controller determines that the candidate unit of agricultural product is not the desired unit of agricultural product, the controller accesses the records in the database to identify the candidate unit of agricultural product as a function of the location of the candidate unit and the heading of the loading vehicle.

According to yet another preferred aspect of the invention, the record further includes information associated with the harvested unit of agricultural product including at least some of: seed type, timing and quantity of one or more chemicals or fertilizers applied, time of harvest, yield data at time of harvest, moisture content, harvesting location, identification of a processing facility, yield data at the processing facility, and quality of the agricultural product Advantageously, the present invention provides more certainty in identification of units of agricultural product during transport. Yield and quality data recorded for each unit can be correlated with the area from which the unit was harvested with more certainty, and future decisions can be made based thereon. Another benefit of the invention includes the ability to track the unit of agricultural product by transport vehicle. Loss or damage to the unit may be assigned more accurately and equitably, and performance of equipment and operators may be more tangibly assessed.

As an illustration of an operational advantage of the system and method of the invention, using cotton modules as a non-limiting example, as noted above, it is a common practice to unload multiple modules from multiple harvesting vehicles in end to end relation along the periphery of a field, from different directions. The length of the harvesting vehicles when unloading, including module holding apparatus and unloading ramp can exceed 30 feet (7 meters), and both are tilted when unloading. When unloading, the harvesting vehicle will be traveling forward, and the exact location of the unloaded module (when it is finally stationary) may not be known exactly by the harvesting vehicle operator (but will be sensed by the system and thus known, as will be the harvesting vehicle position and heading as a function of the location and heading systems). If a second module is unloaded in end to end relation to the first module, it may be placed against the front of the first module or the rear. And one or more subsequent modules may be unloaded in end to end abutment to one or more of the existing modules. A transport operator arriving to load a module or modules may be confused by the presence of multiple modules at the loading location and thus uncertain as to the identity of a particular module. The operator may drive the transport vehicle beside the line of modules and be unable to visually discern which module or modules is/are to be loaded, and available GPS system information alone may be insufficient to discern the modules (at least two adjacent modules), but using the recorded location and heading systems' information for the modules, the controller will be able to discern the candidate modules so the desired one or ones can be loaded. Additionally, the invention allows the module or modules to be loaded from either direction, and will record the heading and position information so that the identity of the loaded module or modules will be known. Even if it is not required to load the modules in a particular order, the identity of the modules will be known for future use.

DETAILED DESCRIPTION OF THE INVENTION

Figure 1:
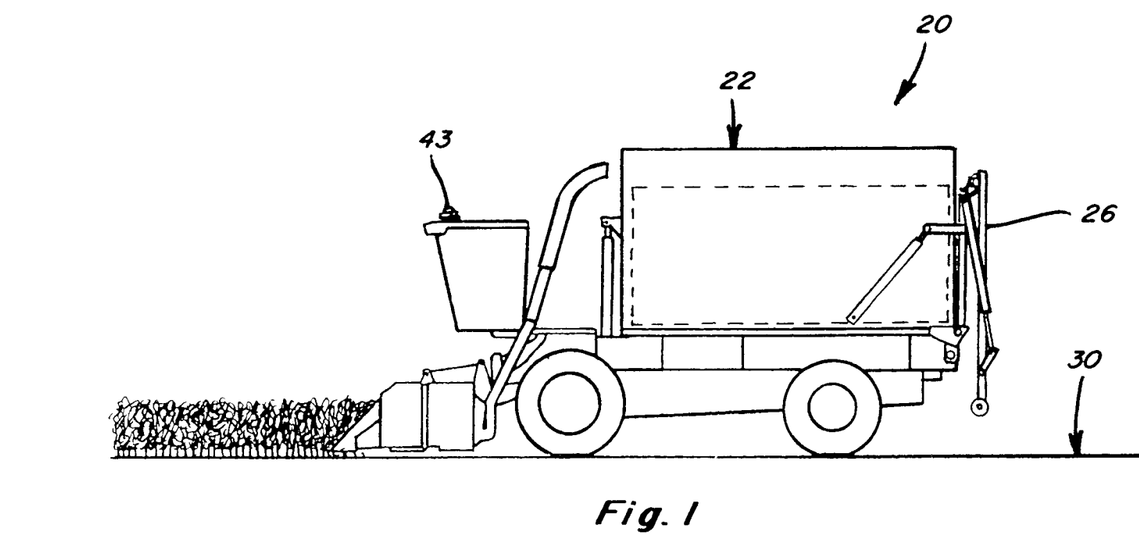
FIG. 1 is a simplified side view of a module forming apparatus as part of a cotton harvesting vehicle having an on-board cotton module builder including a foldable unloading door arrangement in a harvesting configuration.
Figure 2:
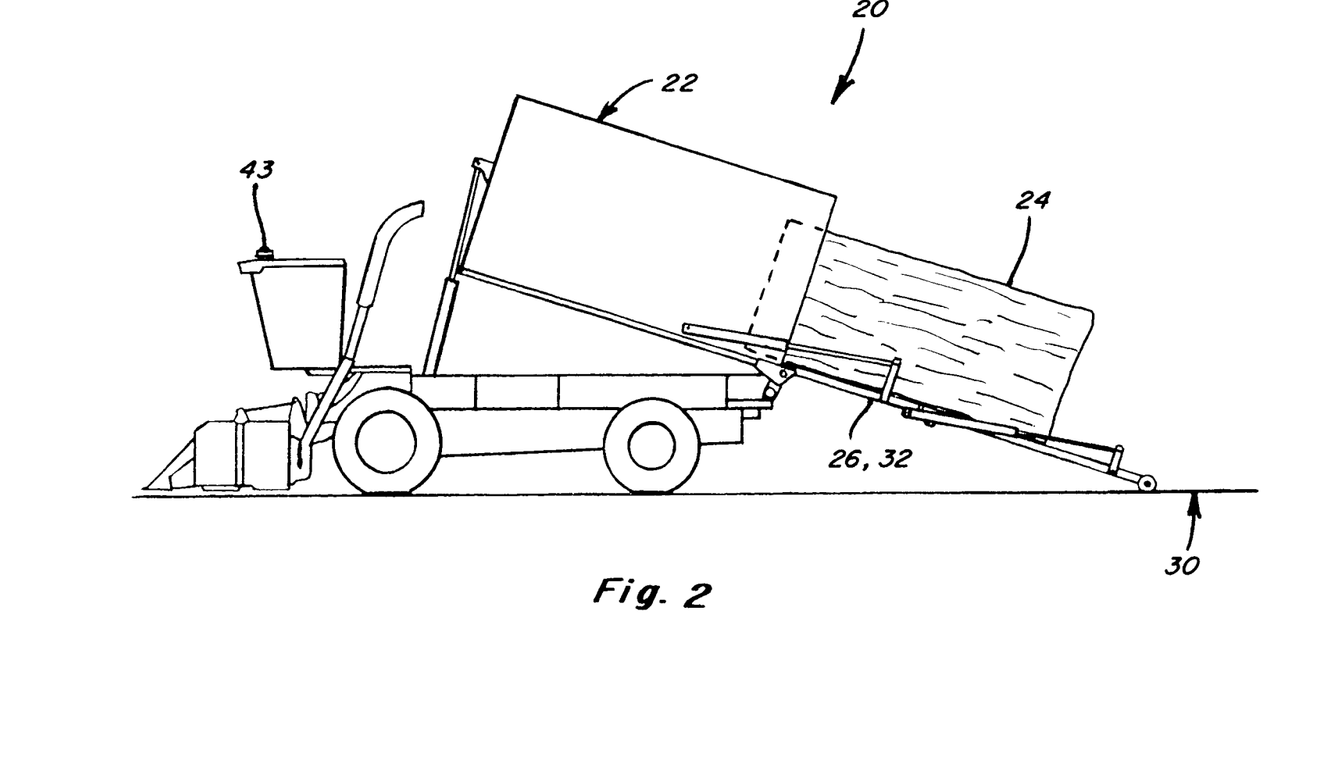
FIG. 2 is another simplified side view of the module forming apparatus of the harvesting vehicle in an unloading configuration showing a cotton module moving from the module builder to a surface therebelow.
Figure 3:
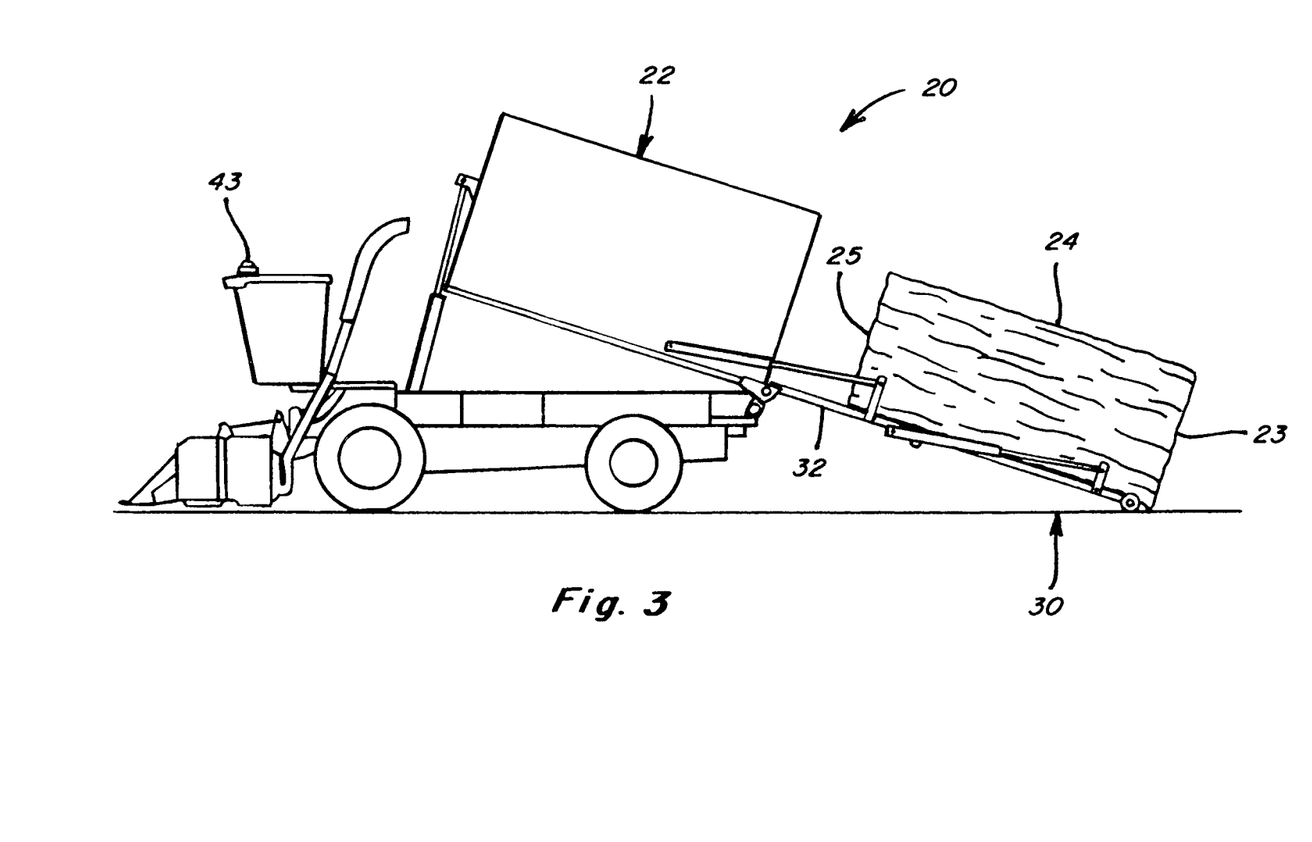
FIG. 3 is yet another simplified side view of the module forming apparatus of the harvesting vehicle in the unloading configuration showing the cotton module as it reaches the surface.
Figure 4:
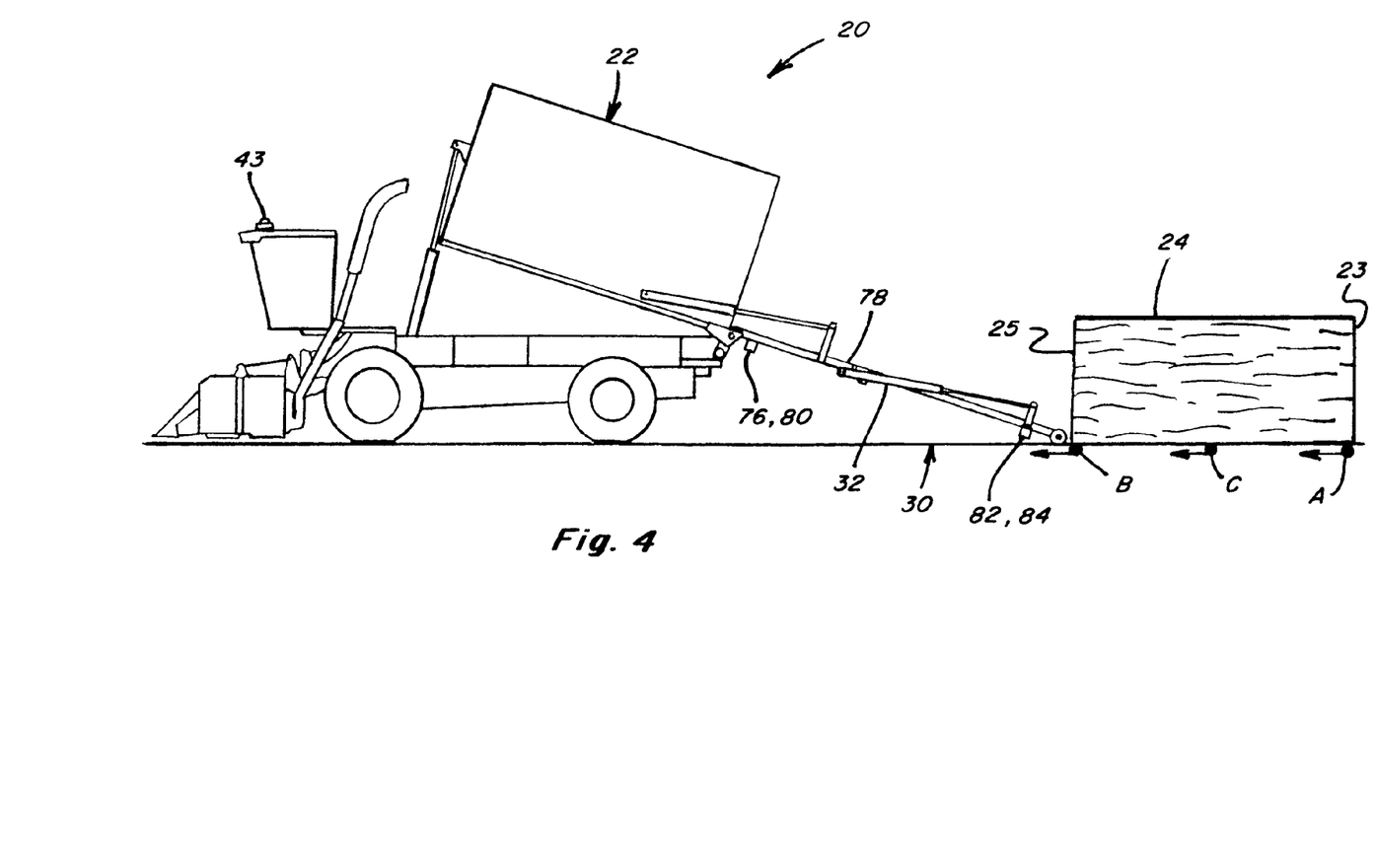
FIG. 4 is yet another simplified side view of the module forming apparatus of the harvesting vehicle in the unloading configuration after the cotton module has been unloaded.
Figure 5:
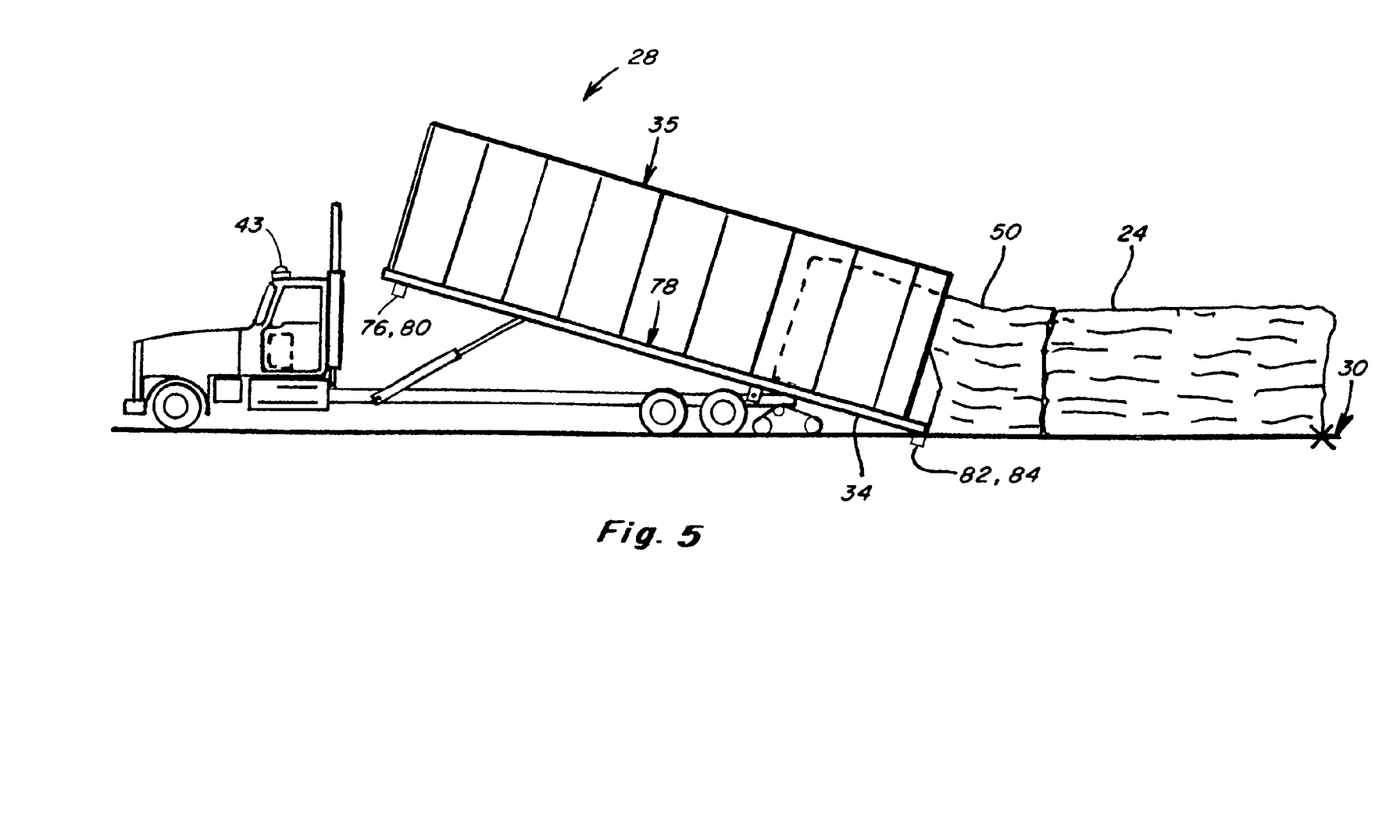
FIG. 5 is a simplified side view of a cotton module transport vehicle in the loading/unloading position.

Referring now to the drawings, FIGS. 1 through 4 depict a self propelled cotton harvesting vehicle 20 including an on-board module forming apparatus, typically referred to as a cotton module builder 22, of well-known construction and operation. A cotton module 24 is formed and held within module builder 22 until vehicle 20 is in position to unload. Then an unloading door 26 unfolds to form a ramp 32 as cotton module builder 22 is tilted to provide a continuous level surface for unloading cotton module 24 from module builder 22 to a surface 30, in this case, the ground. Referring also to FIG. 5 which depicts a representative cotton module transport vehicle 28, also of well-known construction and operation, suitable for loading, transporting, and unloading cotton module 24 to another location, such as from a field to another collection area and/or to a processing facility. Transport vehicle 28 includes a deployable ramp 34 for loading and unloading cotton module 24 between surface 30 and a holding structure 35 thereof. Cotton module 24 is moved along ramp 32, 34 by a suitable driver system 76 which may include one or more independently controllable powered drag chains 78, belts, rollers, or the like. As representative, but non-limiting values, a bale or cotton module 24 will have a length of about 16 feet, a width of about 8 feet and a height also of about 8 feet, or 500×250×250 cm. It should be noted that the invention is contemplated for use with harvesting vehicles and other machinery for harvesting and/or picking up or transporting any of a wide variety of plant material and biomass, and therefore is not limited to cotton, or transporters configured for loading modules from the ground, and can thus also include, for example, transporters configured for receiving a module directly from a harvesting vehicle or another transport vehicle.

Figure 6:
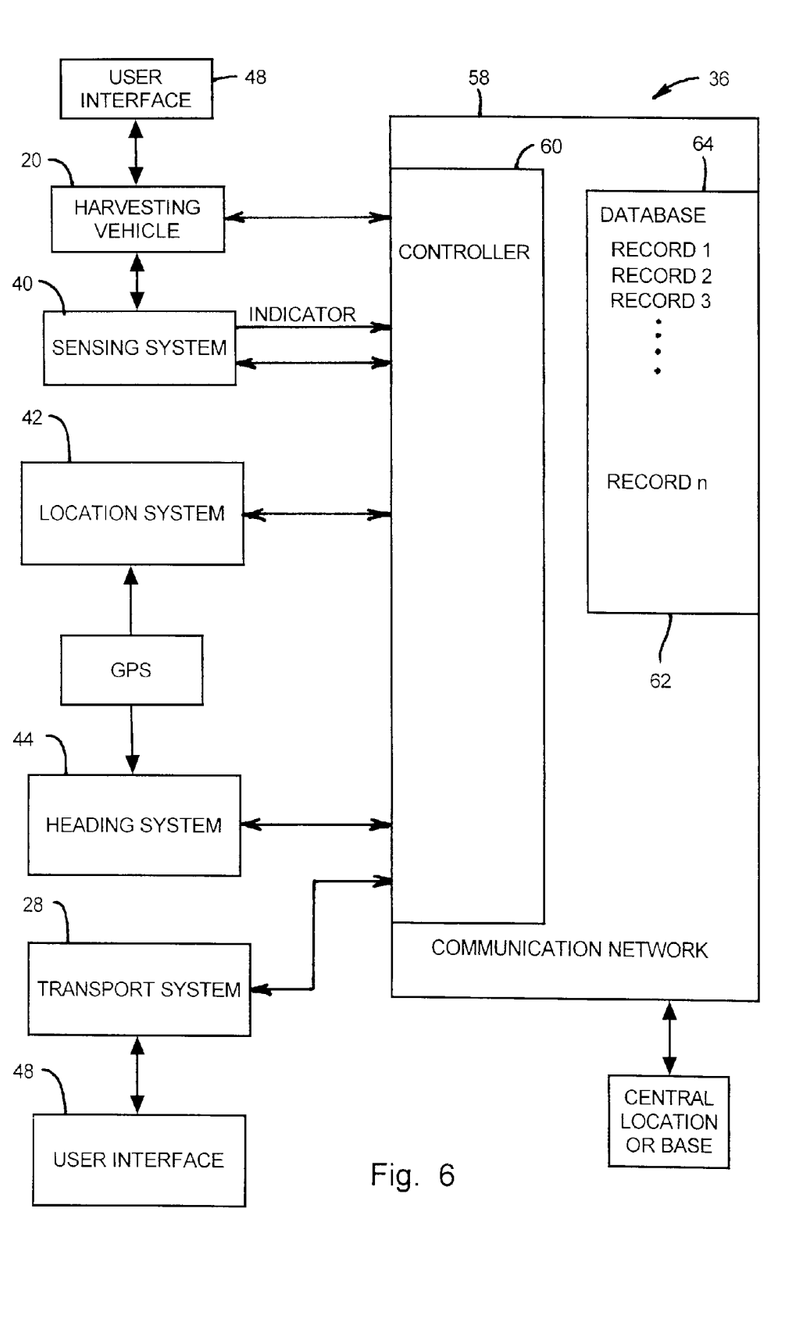
FIG. 6 is a simplified schematic representation of a preferred embodiment of the system of the present invention.

Referring also to FIG. 6, according to a preferred embodiment of the invention, a system 36 and method for determining a location of an unloaded cotton module and locating a desired cotton module includes a communication network 58 configured and operable to communicate information between harvesting vehicle 20 and transport vehicle 28 or between a central location (not shown) and harvesting vehicle 20 and transport vehicle 28. System 36 also includes a sensing system 40 associated with harvesting vehicle 20 and/or transport vehicle 28 for determining positions or progress of cotton module 24 relative to ramp 32, 34 during loading and/or unloading. During an unloading operation, sensing system 40 provides an indicator when cotton module 24 is stationary on surface 30 or a location in predetermined relation thereto. For example, sensing system 40 may provide the indicator when a first end 23 of cotton module 24 reaches and is stationary on surface 30, or when a second end 25 of cotton module 24 has left ramp 32, 34, or both. (FIG. 3) During a loading operation, sensing system 40 provides an indicator when the loading structure or ramp 34 has reached a loading position for cotton module 24 or a location in predetermined relation thereto. As non-limiting examples, sensing system 40 may include sensors 80 that sense force or torque exerted on one or more drag chains 78 of driver system 76. Changes in the force or torque may be monitored to determine the location of cotton module 24 along ramp 32, 34, or the departure of module 24 therefrom. Other examples include a sensor 82, such as a load sensor, contact sensor, radar, sonic or other device that can sense presence and absence of module 24 from the end of ramp 32, 34. As another option, an optical sensor 84 may be monitored to determine when cotton module 24 passes a point on ramp 32, 34 or when ramp 34 is in close proximity to cotton module 24. (See FIGS. 4-5.) Other well known sensing arrangements may be used to configure sensing system 40 for operation to provide an indicator when cotton module 24 and ramp 32, 34 have reached a predetermined relationship therebetween, e.g., the module has left the ramp and is therefore stationary and is not being dragged, or otherwise still moving with the harvesting or transport vehicle.

Communication network 58 includes at least one controller 60 and facilitates communication between sensing system 40, a location system 42, and a heading system 44. Communication network 58 may also send and receive information regarding unloading and loading cotton modules and locations thereof through a user interface 48 associated with harvesting vehicle 20, transport vehicle 28, and the central location (not shown). Location system 42 is configured and operable to receive information, such as global positioning system (GPS) information identifying a location of an antenna or a receiver 43 of vehicle 20, 28. In addition, a heading system 44 receives the GPS information and determines or approximates a heading of vehicle 20, 28 based thereon.

During an unloading operation, controller 60 is configured and operable for automatically determining a location of unloaded cotton module 24 as a function of the location of receiver 43 of vehicle 20, 28 and the heading thereof when sensing system 40 has sensed and indicated that cotton module 24 has reached surface 30 or the location in predetermined relation thereto.

According to a preferred feature of the invention, the location of cotton module 24 comprises a location of a predetermined reference point of module 24 and the heading of harvesting or transport vehicle 20, 28. For example, in FIG. 4, if sensing system 40 provides an indicator when first end 23 of cotton module 24 reaches and is determined to be stationary on surface 30, point A is determined to be the location of unloaded cotton module 24. In this regard, it should be noted that torque or force levels exerted on drag chain or chains 78, or exerted against ramp 32, 34, via an appropriate load sensor or sensors 80, and/or optical sensors 84, and/or contact switches or pads, radar, and sonic sensors 82, can be used to determine the position or presence of module 24 at one or more locations on ramp 32, 34. If sensing system 40 provides an indicator when second end 25 of cotton module 24 has left ramp 32, 34 and thus has reached surface 30, point B is determined to be the stationary location of unloaded cotton module 24. As another possibility, if sensing system 40 provides an indicator when the midpoint of cotton module 24 has reached and is stationary on surface 30, point C of cotton module 24 is determined to be the location of unloaded cotton module 24. This location and the other location can also be determined from any one of the other locations if the pertinent dimension, e.g., length, of the module is known. It is important to point out that in each case, the heading of vehicle 20, 28, represented by an arrow at each point, is associated with the reference location.

Figure 7:
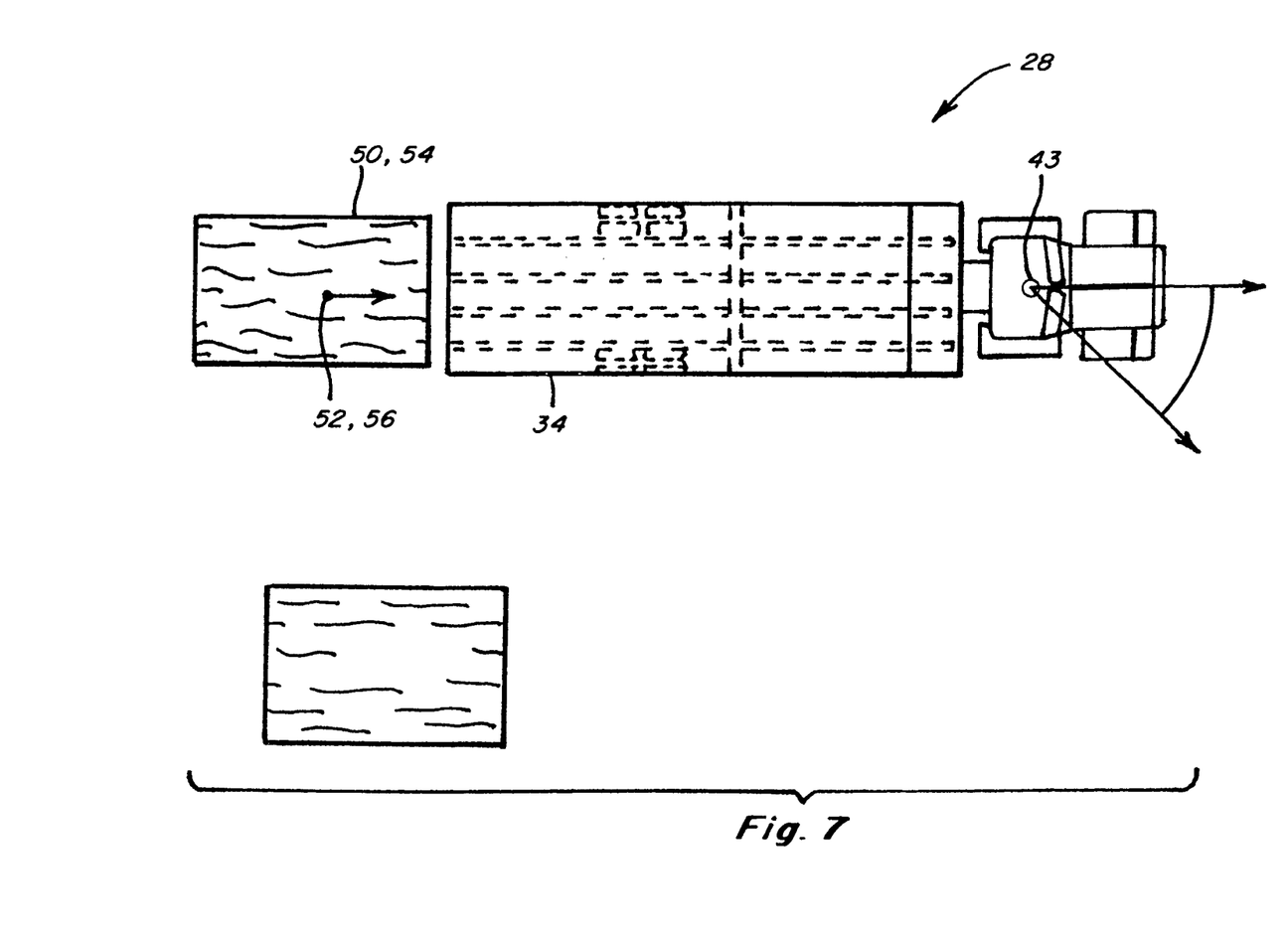
FIG. 7 is an example of a transport vehicle locating a desired cotton module for pickup.
Figure 8:
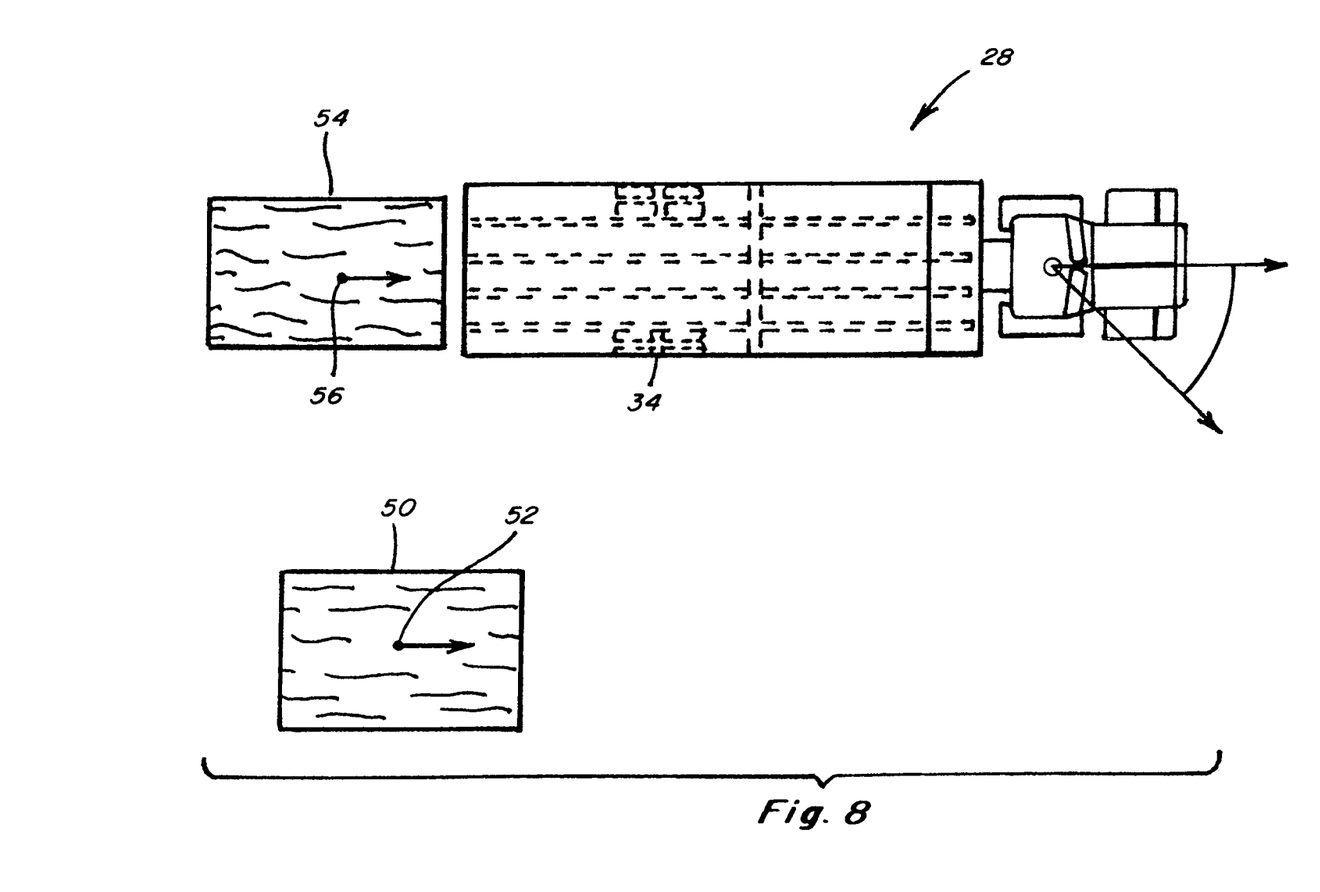
FIG. 8 is an example of the transport vehicle locating a candidate cotton module that is not the desired cotton module.

With reference also to FIGS. 7-8, according to a preferred aspect of the invention, during a loading operation, wherein the loading or transport vehicle 28 seeks to load a desired cotton module 50 at a desired location 52, controller 60 is configured and operable to automatically determine whether a candidate cotton module 54 at a candidate location 56 is desired cotton module 50 as a function of the location of receiver 43 of transport vehicle 28 and the heading thereof when sensing system 40 has sensed and indicated that the structure or ramp 34 has reached candidate cotton module 54 or the location in predetermined relation thereto.

According to another preferred feature of the invention, controller 60 determines location 56 of candidate cotton module 54 as a function of the location of receiver 43 of loading or transport vehicle 28 when sensing system 40 has sensed and indicated that ramp 34 has reached candidate cotton module 54 or the location in predetermined relation thereto.

Figure 9:
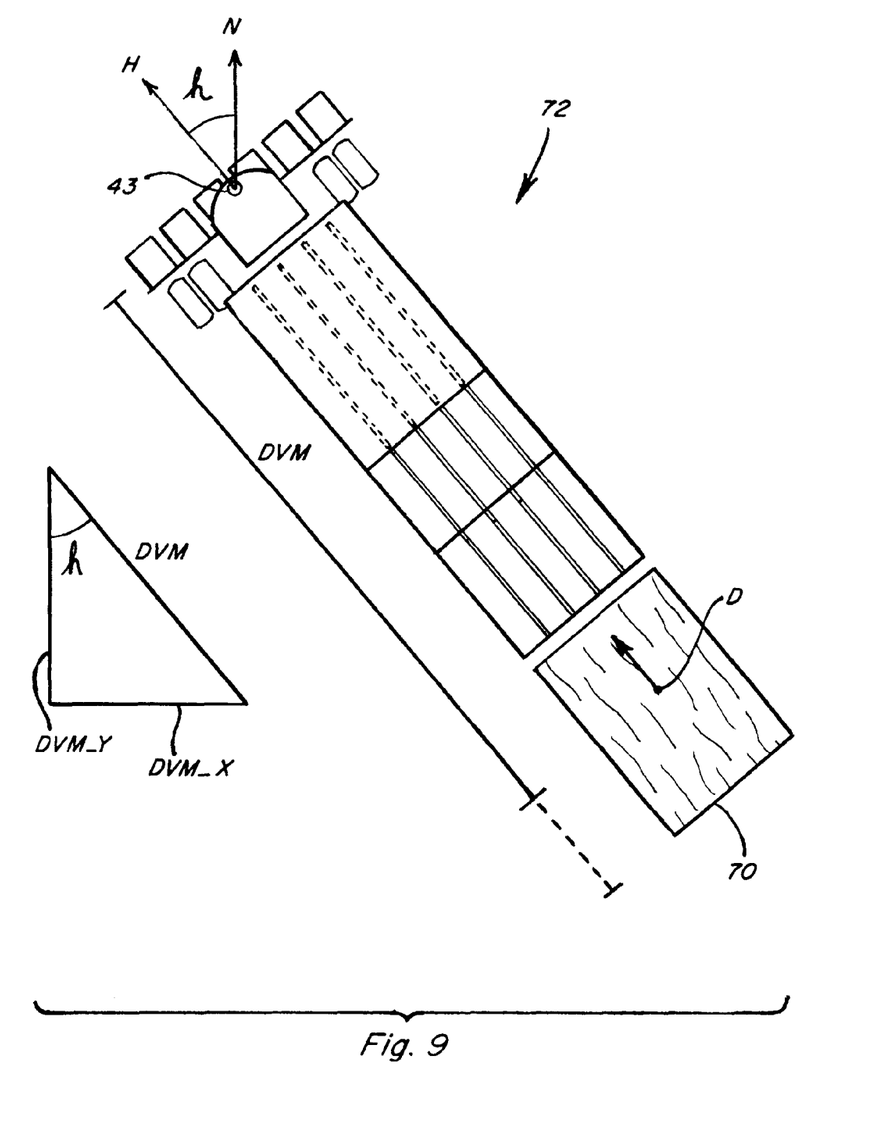
FIG. 9 is a top view of a simplified schematic of a loading or unloading vehicle showing the determination of the location of the cotton module.

Determination of the location of an unloaded cotton module 70 using the GPS position of receiver 43 of a harvesting or transport vehicle 72 at heading H is now explained with reference to FIG. 9. The distance between receiver 43 and reference point D of cotton module 70 in meters is identified as DVM. If h is designated as the angle between heading H and true North, the latitude and longitude components of DVM may be expressed, in meters, as DVM_Y and DVM_X, respectively.

$$DVM\_Y = \cos(h) \times DVM$$

$$DVM\_X = \sin(h) \times DVM$$

Converting meters to degrees, the latitude and longitude components of the distance between receiver 43 and reference point D may be expressed as DVM_Lat and DVM_Lon in degrees latitude and degrees longitude, respectively.

$$DVM\_Lat = \frac{DVM\_Y}{2 * \Pi * R} * 360$$

$$DVM\_Lon = \frac{DVM\_X}{2 * \Pi * R} * 360$$

where R is the radius of the Earth

If the GPS location of receiver 43 is denoted in degrees latitude and degrees longitude as V_Lat and V_Lon, respectively, the location of module 70, M_Lat in degrees latitude and M_Lon in degrees longitude may be determined as follows:

$$M\_Lat = V\_Lat - DVM\_Lat$$

$$M\_Lon = V\_Lon + S * DVM\_Lon \quad S = \frac{V\_Lon}{|V\_Lon|}$$

where S is a multiplier based on whether vehicle 72 is in the Eastern or Western hemisphere.

According to yet another preferred feature of the invention, controller 60 determines that candidate cotton module 54 is desired cotton module 50 when candidate cotton module 54 has location 56 within a predetermined radius, or distance and direction, from location 52 of desired cotton module 50. In addition, controller 60 may additionally use heading information to verify that candidate cotton module 54 is desired cotton module 50. The desired heading may be compared to the candidate heading (if known), or the desired heading may be compared to the heading of transport vehicle 28.

According to another preferred aspect of the invention, when the controller 60 determines that candidate cotton module 54 is desired cotton module 50, as illustrated in FIG. 7, the apparatus of ramp 34 of loading or transport vehicle 28 engages and moves desired cotton module 50 along ramp 34 from surface 30 to holding structure 35 in the loading or transport vehicle 28. FIG. 5 illustrates the loading operation of desired cotton module 50.

Figure 10:
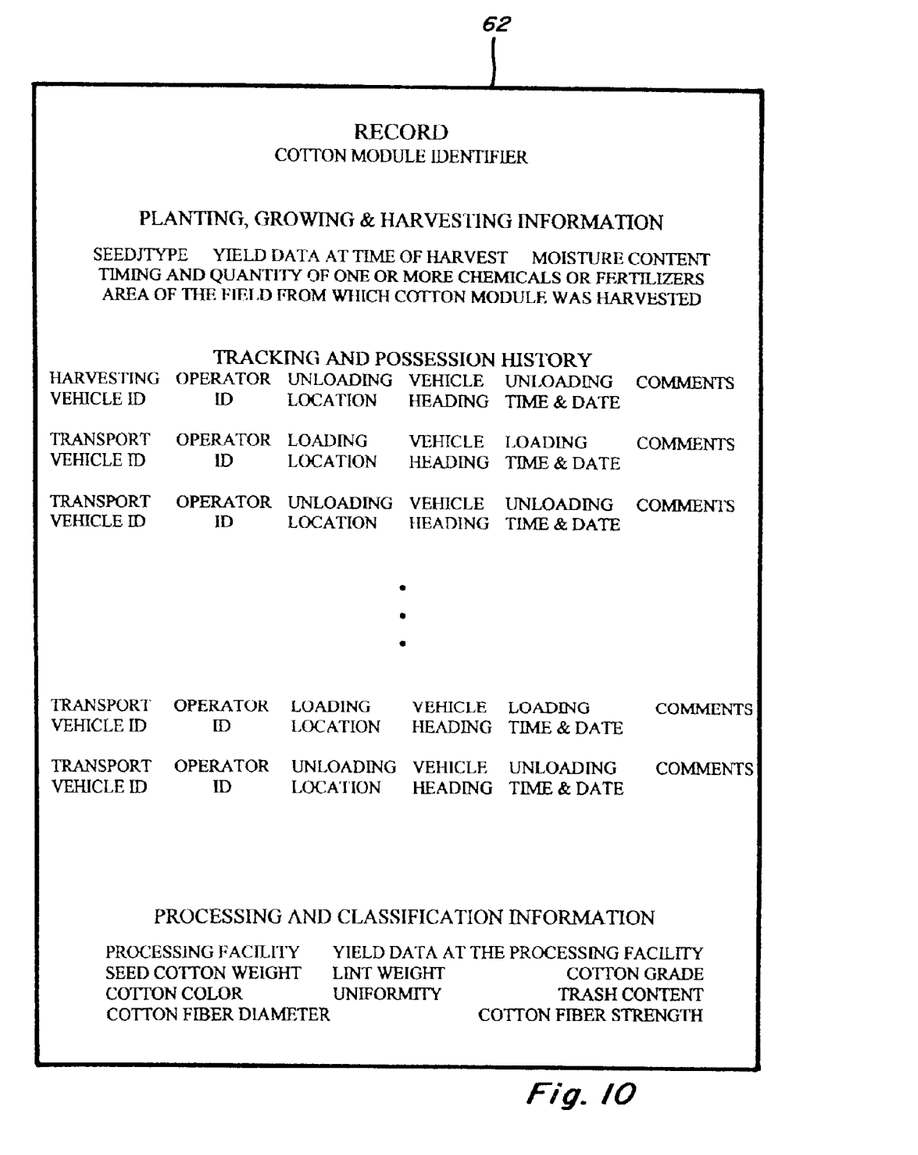
FIG. 10 is an exemplary Record that may be developed according to the invention.

According to yet another preferred aspect of the invention, communication network 58 includes a database 64 of stored records 62 associated with each cotton module 24. (FIG. 6) Referring also to FIG. 10, record 62 includes at least information representative of unloading or loading vehicle identification, unloading or loading time, unloading or loading location, and the heading of the unloading or loading vehicle, respectively, for each time the unit of agricultural product is unloaded or loaded. Additional data stored in record 62 may preferably include information associated with the harvested cotton module including at least some of: seed type, timing and quantity of one or more chemicals or fertilizers applied, time of harvest, yield data at time of harvest, moisture content, harvesting location, identification of a processing facility, yield data at the processing facility, and quality of the processed cotton.

According to yet another preferred feature of the invention, when controller 60 determines that candidate cotton module 54 is not desired cotton module 50, as seen in FIG. 8, the controller may access the records 62 in database 60 to identify candidate cotton module 54 as a function of the location thereof. Once identified, the decision can be made whether to pick up candidate cotton module 54 or continue efforts to locate desired cotton module 50. As a result, using the present invention, if candidate module 54 is transported instead of desired module 50, it is not an error, and data associated with candidate module 54 will be correctly stored in the record associated with module 54. In addition, desired module 50 may be assigned to another transport vehicle.

Figure 11:
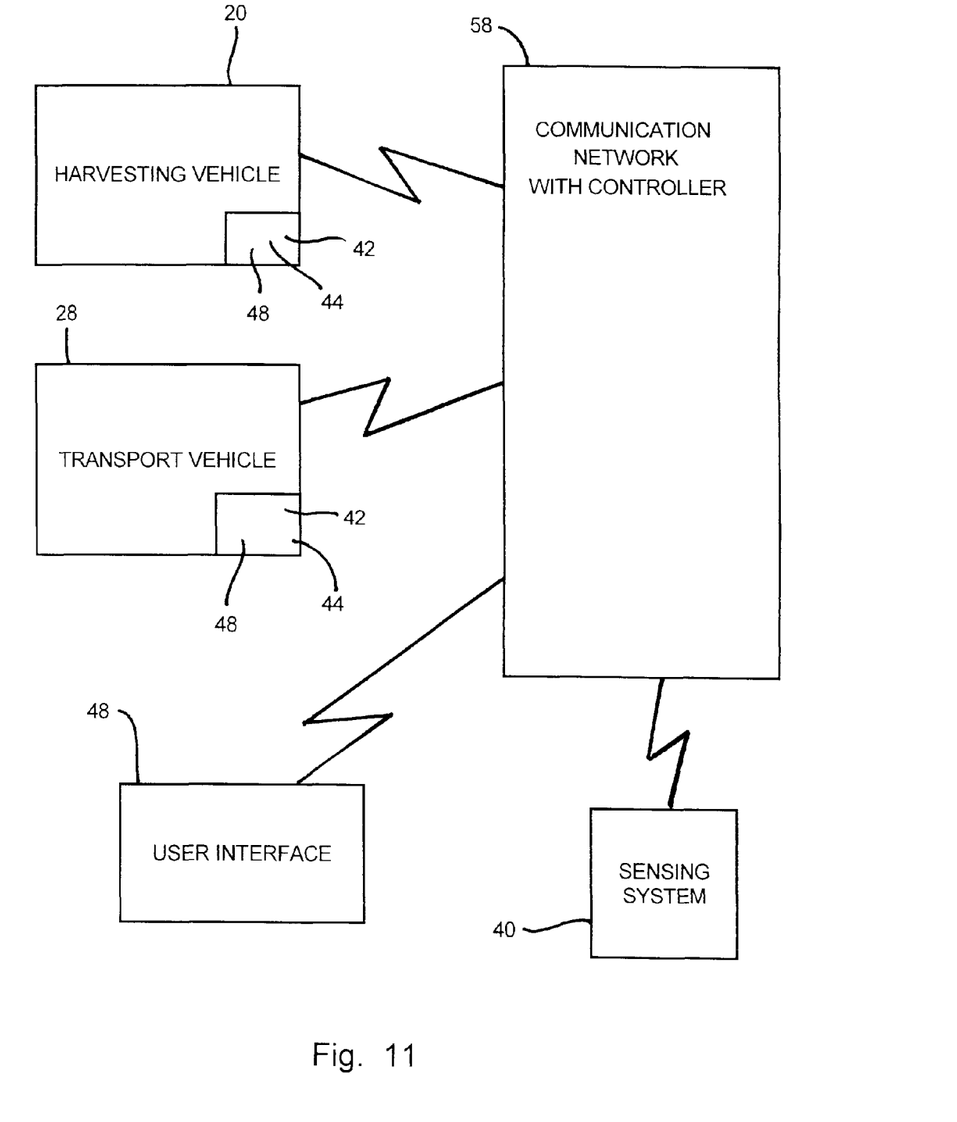
FIG. 11 is another simplified schematic representation of a preferred aspect of the invention.

FIG. 11 illustrates another preferred embodiment of the invention in which the computational activities of system 36 have been redistributed. For example, an on-board computer of harvesting vehicle 20 or transport vehicle 28 may include user interfaces 48 and may act as location system 42 and heading system 44 by processing GPS signals and determining the vehicle heading and location of cotton module 24. It is also contemplated that these systems will have the capability to communicate wirelessly.

As discussed above, the user can determine a location of a cotton module and locate a desired cotton module for transport. Additionally, the user may determine the identity of a candidate cotton module. The present invention is particularly advantageous because information associated with a crop at various phases of production, such as planting, growing, harvesting, transporting, processing, or classifying can be recorded, correlated, and analyzed for future decision making.

It will be understood that the foregoing description is for preferred embodiments of this invention and that the invention is not limited to the specific forms shown. Other modifications may be made in the design and arrangement of other elements without departing from the scope of the invention as expressed in the appended claims.

What is claimed is:

1. A system for determining a location of an unloaded unit of agricultural product and locating a desired unit of agricultural product, the unloaded unit being free of an electronically trackable tag, the system comprising:

a communication network configured and operable to communicate information between an unloading vehicle and a loading vehicle or between a central or base location and the unloading vehicle and the loading vehicle; the vehicles each including a holding structure for the unit of agricultural product and a structure deployable from the holding structure to a surface therebelow;

an unloading apparatus configured and operable to move the unit of agricultural product from the holding structure along the deployed structure to the surface therebelow;

a sensing system configured and operable to sense when the unit of agricultural product has reached and is stationary on the surface or has reached a location in predetermined relation thereto and provide an indicator representative thereof;

a location system configured and operable to receive information identifying a location of a receiver of the unloading vehicle and the loading vehicle, the information being independent of a location of the unloaded unit of agricultural product;

a heading system configured and operable to determine a heading of the unloading vehicle and the loading vehicle; and at least one controller associated with the unloading vehicle and loading vehicle in communication with the location system, the heading system, and the sensing system, configured and operable to automatically determine the location of the unloaded unit of agricultural product as a function of the location of the receiver of the unloading vehicle and the heading thereof in response to the indicator provided by the sensing system.

2. The system of claim 1, further comprising:

a loading apparatus associated with the loading vehicle configured and operable to move the desired unit of agricultural product from the surface to the holding structure along the deployed structure;

the sensing system being configured and operable to sense when the deployed structure has reached a candidate unit of agricultural product or a location in predetermined relation thereto and provide an indicator representative thereof; and the at least one controller being configured and operable to automatically determine whether the candidate unit of agricultural product is the desired unit of agricultural product as a function of the location of the receiver of the loading vehicle and the heading thereof when the sensing system has sensed and indicated that the deployed structure has reached the candidate unit of agricultural product or the location in predetermined relation thereto.

3. The system of claim 2, wherein the controller determines a location of the candidate unit of agricultural product as a function of the location of the receiver of the loading vehicle when the sensing system has sensed and indicated that the loading structure has reached the candidate unit of agricultural product or the location in predetermined relation thereto.

4. The system of claim 3, wherein the desired unit of agricultural product comprises the candidate unit of agricultural product having the location within a predetermined radius, or distance and direction from the location of the desired unit of agricultural product.

5. The system of claim 4, wherein the heading of the unloading vehicle of the desired unit of agricultural product is compared to the heading of the loading vehicle located at the candidate unit of agricultural product.

6. The system of claim 2, wherein when the controller determines that the candidate unit of agricultural product is the desired unit of agricultural product, the loading vehicle apparatus engages and moves the desired unit along the loading structure from the surface to the holding structure in the loading vehicle.

7. The system of claim 2, wherein the location of the unit of agricultural product comprises a location of a predetermined reference point of the unit, and the predetermined reference point is a function of the heading of the unloading vehicle.

8. The system of claim 3, wherein a record stored in a database is associated with the unit of agricultural product, and the record includes at least information representative of unloading or loading vehicle identification, unloading or loading time, unloading or loading location, and the heading of the unloading or loading vehicle, respectively, for each time the unit of agricultural product is unloaded or loaded.

9. The system of claim 8, wherein when the controller determines that the candidate unit of agricultural product is not the desired unit of agricultural product, the controller accesses the records in the database to identify the candidate unit of agricultural product as a function of the location of the candidate unit and the heading of the loading vehicle.

10. The system of claim 8, wherein the record further includes information associated with the harvested unit of agricultural product including at least some of: seed type, timing and quantity of one or more chemicals or fertilizers applied, time of harvest, yield data at time of harvest, moisture content, harvesting location, identification of a processing facility, yield data at the processing facility, and quality of the agricultural product.

11. A method for determining a location of an unloaded unit of agricultural product and locating a desired unit of agricultural product, comprising:

communicating information between an unloading vehicle and a loading vehicle or between a central location or base and the unloading vehicle and the loading vehicle along a communication network;

sensing when the unit of agricultural product has unloaded to a surface and is stationary thereon or has reached a location in predetermined relation thereto with a sensing system, the sending system providing an indicator representative thereof;

receiving information identifying a location of a receiver of the unloading vehicle and the loading vehicle with a location system in response to the indicator, the information being independent of a location of the unloaded unit of agricultural product;

determining a heading of the unloading vehicle and the loading vehicle with a beading system; and providing at least one controller associated with the unloading vehicle and loading vehicle in communication with the location, system, the heading system, and the sensing system, for automatically determining a location of the unloaded unit of agricultural product as a function of the location of the receiver of the unloading vehicle and the heading thereof in response to the indicator provided by the sensing system.

12. The method of claim 11, further including the steps of:

sensing when a loading structure of the loading vehicle has reached a candidate unit of agricultural product or a location in predetermined relation thereto and providing an indicator representative thereof; and automatically determining whether the candidate unit of agricultural product is the desired unit of agricultural product as a function of the location of the receiver of the loading vehicle and the heading thereof when the sensing system has sensed and indicated that the loading structure has reached the candidate unit of agricultural product or the location in predetermined relation thereto.

13. The method of claim 12, further including determining a location of the candidate unit of agricultural product as a function of the location of the receiver of the loading vehicle when the sensing system has sensed and indicated that the loading structure has reached the candidate unit of agricultural product or the location in predetermined relation thereto.

14. The method of claim 13, wherein the desired unit of agricultural product comprises the candidate unit of agricultural product having the location within a predetermined radius, or distance and direction, from the location of the desired unit of agricultural product.

15. The method of claim 14 wherein the heading of the unloading vehicle of the desired unit of agricultural product is compared to the heading of the loading vehicle located at the candidate unit of agricultural product.

16. The method of claim 12, further including loading the candidate unit of agricultural product on the loading vehicle after the controller determines that the candidate unit of agricultural product is the desired unit of agricultural product.

17. The method of claim 12, wherein the location of the unit of agricultural product comprises a location of a predetermined reference point of the unit, and the predetermined reference point is a function of the heading of the unloading vehicle.

18. The method of claim 13, further including associating a record stored in a database with the unit of agricultural product the record including at least information representative of unloading or loading vehicle identification, unloading or loading time, unloading or loading location, and the heading of the unloading or loading vehicle, respectively, for each time the unit of agricultural product is unloaded or loaded.

19. The method of claim 18, further including accessing the records in the database to identify the candidate unit of agricultural product as a function of the location of the candidate unit when the controller determines that the candidate unit of agricultural product is not the desired unit of agricultural product.

20. The method of claim 18, wherein the record further includes information associated with the harvested unit of agricultural product including at least some of: seed type, timing and quantity of one or more chemicals or fertilizers applied, time of harvest, yield data at time of harvest, moisture content, harvesting location, identification of a processing facility, yield data at the processing facility, and quality of the agricultural product.

* * * * *